(12) United States Patent
Konno et al.

(10) Patent No.: US 10,994,653 B2
(45) Date of Patent: May 4, 2021

(54) VEHICLE PROXIMITY NOTIFICATION DEVICE, VEHICLE AND VEHICLE PROXIMITY NOTIFICATION METHOD

(71) Applicant: PANASONIC INTELLECTUAL PROPERTY MANAGEMENT CO., LTD., Osaka (JP)

(72) Inventors: Fumiyasu Konno, Osaka (JP); Ichiro Ohno, Osaka (JP); Shinnosuke Nagasawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/822,679

(22) Filed: Mar. 18, 2020

(65) Prior Publication Data

US 2020/0307452 A1    Oct. 1, 2020

(30) Foreign Application Priority Data

Mar. 27, 2019 (JP) .............. JP2019-061993

(51) Int. Cl.
*B60Q 5/00* (2006.01)
*B60W 40/04* (2006.01)
*B60W 50/14* (2020.01)

(52) U.S. Cl.
CPC ............. *B60Q 5/006* (2013.01); *B60W 40/04* (2013.01); *B60W 50/14* (2013.01); *B60W 2050/143* (2013.01)

(58) Field of Classification Search
CPC ....... B60Q 5/006; B60W 40/04; B60W 50/14; B60W 2050/143; G08B 3/00; H04R 2420/01; H04R 2499/13
USPC .......................................... 340/436
See application file for complete search history.

(56) References Cited

U.S. PATENT DOCUMENTS

| | | | |
|---|---|---|---|
| 7,106,180 B1* | 9/2006 | Pompei | A01M 29/18 340/384.7 |
| 9,893,699 B2* | 2/2018 | Zollner | B60Q 5/008 |
| 2014/0056438 A1* | 2/2014 | Baalu | G10K 15/02 381/86 |
| 2019/0009717 A1 | 1/2019 | Nagasawa et al. | |

FOREIGN PATENT DOCUMENTS

| | | |
|---|---|---|
| JP | 3026078 | 3/2000 |
| WO | 2017/125990 | 7/2017 |

* cited by examiner

*Primary Examiner* — John A Tweel, Jr.
(74) *Attorney, Agent, or Firm* — Greenblum & Bernstein, P.L.C.

(57) ABSTRACT

A vehicle proximity notification device for notifying a vehicle approach using a first speaker and a second speaker provided in the vehicle includes a sound source that outputs a signal that corresponds to a sound for notifying an approach of the vehicle and that is input to the first speaker and the second speaker; and an information processor that changes a phase of at least one signal out of a signal input to the first speaker and a signal input to the second speaker in accordance with a speed of the vehicle.

12 Claims, 16 Drawing Sheets

VEHICLE PROXIMITY NOTIFICATION DEVICE, VEHICLE AND VEHICLE PROXIMITY NOTIFICATION METHOD

CROSS REFERENCE TO RELATED APPLICATION

The present application is based on and claims priority of Japanese Patent Application No. 2019-061993 filed on Mar. 27, 2019.

FIELD

The present disclosure relates to a vehicle proximity notification device that is provided in a vehicle and outputs a sound for notifying the approach of the vehicle to the outside, a vehicle equipped with the vehicle proximity notification device, and a vehicle proximity notification method.

BACKGROUND

Since electric vehicles and hybrid vehicles have low noise, there is a problem that pedestrians and the like are unlikely to notice the approach of the vehicle when the vehicle is in motion at a low speed with a low road noise of the own vehicle. For this reason, low-noise vehicles such as electric vehicles and hybrid vehicles are provided with a vehicle proximity notification device that warns a pedestrian or the like of approaching the vehicle by outputting a sound (also referred to as a notification sound) reminding the moving state of the vehicle when in motion.

On the other hand, if the notification sound is output to the vehicle exterior, the notification sound may also enter the vehicle interior and give discomfort to the passengers in the vehicle interior.

Patent Literature 1 (PTL 1) discloses a technique for reducing discomfort to the passengers of the vehicle by giving a phase difference among each of notification sounds output from a plurality of speakers to move a position at which a sound output from a plurality of speakers can be heard or cancel out the sound.

CITATION LIST

Patent Literature

PTL 1: International Publication No. 2017/125990

SUMMARY

Technical Problem

However, the technique of PTL 1 described above has room for improvement.

Therefore, the present disclosure provides a vehicle proximity notification device that can achieve further improvement.

Solution to Problem

A vehicle proximity notification device according to an aspect of the present disclosure is a vehicle proximity notification device for notifying the approach of the vehicle using a first speaker and a second speaker provided in the vehicle, comprising: a sound source that outputs a signal that corresponds to a sound for notifying an approach of the vehicle and that is input to the first speaker and the second speaker; and an information processor that changes a phase of at least one signal out of a signal input to the first speaker and a signal input to the second speaker in accordance with a speed of the vehicle.

Note that these general or specific aspects may be realized by a system, a method, an integrated circuit, a computer program or a recording medium such as a computer-readable CD-ROM, and may be realized by any combination of the system, the method, the integrated circuit, the computer program and the recording medium.

Advantageous Effects

A vehicle proximity notification device according to an aspect of the present disclosure can achieve further improvement.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
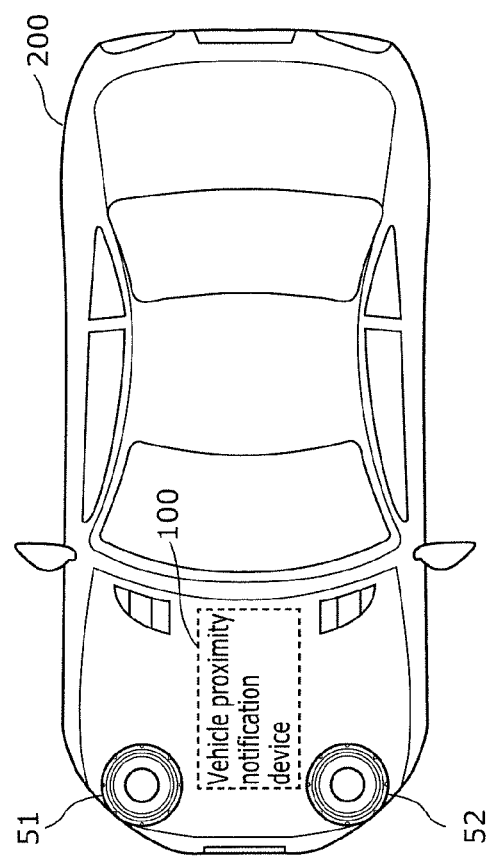
FIG. 1 is a diagram showing an example of a vehicle equipped with a vehicle proximity notification device according to Embodiment 1.

DESCRIPTION OF EMBODIMENTS (Underlying Knowledge Forming Basis of the Present Disclosure)

Regarding the notification sound output from low-noise vehicles such as electric vehicles and hybrid vehicles, the regulation of the minimum sound pressure value is being examined in the regulations of North America NHTSA (National Highway Traffic Safety Administration). For example, a minimum sound pressure value is defined for eight frequency bands of ⅓ octave, and it is necessary to output a notification sound greater than or equal to the minimum sound pressure value when measured by a predetermined measurement method.

Here, the predetermined measurement method differs between when the vehicle is stationary and when the vehicle is in motion. Specifically, when the vehicle is stationary, the sound pressure of the notification sound is measured by microphones installed on the left and right sides of the front end of the vehicle, the left and right sides of the rear end of the vehicle, and in front of the vehicle when viewed from above. On the other hand, when the vehicle is in motion, the sound pressure of the notification sound is measured by the two microphones when the vehicle passes between the two microphones. That is, the microphone is not installed in front of the vehicle when measuring the sound pressure of the notification sound during the vehicle is in motion. Thus, when the vehicle is in motion, it is not required that the sound pressure of the notification sound in front of the vehicle is greater than or equal to the minimum sound pressure value.

Based on such knowledge, the present inventors have studied a vehicle proximity notification device and the like that can reduce discomfort given to the passengers while effectively outputting a notification sound to the outside of the vehicle.

A vehicle proximity notification device according to an aspect of the present disclosure is a vehicle proximity notification device for notifying an approach of a vehicle using a first speaker and a second speaker which are provided in the vehicle, including: a sound source that outputs a signal that corresponds to a sound for notifying an approach of the vehicle and that is input to the first speaker and the second speaker; and an information processor that changes a phase of at least one signal out of a signal input to the first speaker and a signal input to the second speaker in accordance with a speed of the vehicle.

For example, by changing the phase of at least one signal out of the signal input to the first speaker and the signal input to the second speaker such that the signal input to the first speaker and the signal input to the second speaker have opposite phases to each other, the dipole directivity (directivity of figure of eight) such that the direction of less acoustic radiation is directed into the vehicle interior for the notification sound output from the first speaker and the second speaker can be realized. For example, as stipulated in the North American NHTSA regulations, when the vehicle is stationary, the notification sound at the front of the vehicle is required to have a certain sound pressure value or more, but when the vehicle is in motion, the notification sound at the front of the vehicle is not required to have a certain sound pressure value or more. For this reason, the phase of the at least one signal is not changed in accordance with the speed of the vehicle (vehicle speed), for example, when the vehicle is stationary. In addition, for example, when the vehicle is in motion, the phase of the at least one signal is changed in accordance with the vehicle speed to realize dipole directivity such that the direction with less acoustic emission is directed toward the front of the vehicle and the vehicle interior. Thereby, when the vehicle is stationary, the notification sound can be sufficiently output around the vehicle including the front of the vehicle, and when the vehicle is in motion, it is possible to reduce discomfort caused by the notification sound given to the passengers while sufficiently outputting the notification sound around the vehicle except for the front of the vehicle where the notification sound is not required to have a certain sound pressure or more. In this way, according to the present disclosure, it is possible to reduce discomfort given to the passengers while effectively outputting a notification sound to the outside of the vehicle.

In addition, the sound source may include at least a first sound source that outputs a first signal as a signal input to the first speaker, and a second sound source that outputs a second signal as a signal input to the second speaker, the second signal is a signal having an opposite phase to the first signal, the vehicle proximity notification device further includes a switcher for switching the second signal with the first signal to be input to the second speaker, and the information processor controls the switcher such that the first signal is input to the second speaker when the vehicle is stationary, and the second signal is input to the second speaker when the speed of the vehicle is greater than or equal to a predetermined speed.

According to this, when the vehicle is stationary, by controlling the switcher such that the same first signal is input to the first speaker and the second speaker (that is, the same phase is input to the first speaker and the second speaker), it is possible to output sufficiently around the vehicle including the front of the vehicle. On the other hand, when the vehicle speed is greater than or equal to the predetermined speed, the switcher is controlled such that the first signal is input to the first speaker and the second signal is input to the second speaker (that is, signals of opposite phases are input to the first speaker and the second speaker, respectively), and thereby it is possible to realize dipole directivity such that the direction of less acoustic emission is directed to the front of the vehicle and the vehicle interior. In this way, by simply controlling the switcher in accordance with the vehicle speed, it is possible to easily reduce discomfort given to the passengers while effectively outputting a notification sound to the outside of the vehicle.

In addition, the switcher may be a mixer, and the information processor may control the information processor may control the switcher to increase a ratio of the second signal input to the second speaker relative to the first signal as the speed of the vehicle increases toward the predetermined speed, and to prevent the first signal from being input to the second speaker and to cause the second signal to be input to the second speaker when the speed of the vehicle reaches the predetermined speed.

According to this, the directivity can be gradually changed to the dipole directivity as the vehicle speed increases.

In addition, the vehicle proximity notification device further includes a phase shifter that is provided between the sound source and at least one of the first speaker or the second speaker, and adjusts the phase of the at least one signal, wherein the information processor controls the phase shifter to change the phase of the at least one signal in accordance with a speed of the vehicle.

According to this, changing the phase of at least one signal out of the signal input to the first speaker and the signal input to the second speaker in accordance with the speed of the vehicle can be realized by controlling the phase shifter in accordance with the vehicle speed. Therefore, by simply controlling the phase shifter in accordance with the vehicle speed, it is possible to easily reduce discomfort given to the passengers while effectively outputting a notification sound to the outside of the vehicle.

In addition, the information processor may control the phase shifter to increase a frequency range in which a phase difference between a signal input to the first speaker and a signal input to the second speaker is greater than or equal to a predetermined value as the speed of the vehicle increases.

Here, that the phase difference between the signal input to the first speaker and the signal input to the second speaker is greater than or equal to a predetermined value means that the phase difference is close to 180 degrees, for example. Therefore, as the vehicle speed increases, dipole directivity can be realized such that a direction in which sound emission is small in a wide frequency range is directed toward the front of the vehicle and the vehicle interior.

In addition, the phase shifter may be a first-order phase shifter that is provided between the sound source and one speaker out of the first speaker and the second speaker, and adjusts a phase of the signal input to the one speaker.

The first-order phase shifter has a phase characteristic such that the phase becomes closer to 180 degrees inversion as the frequency becomes lower. Generally, when a vehicle starts moving, road noise (tire pattern noise or the like) including a large amount of low frequency components starts to be generated from the moving vehicle, and as the vehicle speed increases, higher frequency components are also included. Therefore, even if the sound pressure of the low frequency components of the notification sound is reduced by the first-order phase shifter when the vehicle starts moving, road noise including a large amount of low frequency components is generated from the moving vehicle. Therefore, even in front of the vehicle in which the sound pressure of the low-frequency components of the notification sound is low, the approach of the vehicle can be notified by supplementing the notification sound with the road noise. Then, since the higher frequency components are included in the road noise as the vehicle speed increases, the frequency range in which the phase difference is greater than or equal to a predetermined value increases as the vehicle speed increases (specifically, the frequency range increases toward the high frequency side). Accordingly, the approach of the vehicle can be notified by road noise even in front of the vehicle in which the sound pressure is low in a wide frequency range for the notification sound.

In addition, the phase shifter may include a first phase shifter that is provided between the sound source and the first speaker, and adjusts a phase of a signal input to the first speaker; and a second phase shifter that is provided between the sound source and the second speaker, and adjusts a phase of a signal input to the second speaker, and the first phase shifter and the second phase shifter are each an nth-order phase shifter (n is an integer of two or more).

The nth-order phase shifter has a phase characteristic such that the phase is inverted by 180 degrees at a specific frequency. Therefore, the frequency at which the phase of the signal input to the first speaker is inverted is adjusted by the first phase shifter, and the frequency at which the phase of the signal input to the second speaker is inverted is adjusted by the second phase shifter, and thereby the frequency range in which the phase difference between the signal input to the first speaker and the signal input to the second speaker is greater than or equal to a predetermined value can be finely adjusted.

In addition, the phase shifter is a second-order phase shifter that is provided between the sound source and one speaker out of the first speaker and the second speaker, and adjusts a phase of a signal input to the one speaker, the signal output from the sound source includes a first band noise and a second band noise having different frequencies from each other, and the information processor may control the phase shifter to overlap a frequency range in which a phase difference between a signal input to the first speaker and a signal input to the second speaker is greater than or equal to a predetermined value and a frequency of the first band noise, and to prevent the frequency range and a frequency of the second band noise from overlapping. For example, the frequency of the first band noise may be lower than the frequency of the second band noise.

According to this, the sound leakage of the notification sound into the vehicle interior may be reduced, and the discomfort given to the passengers can be reduced.

In addition, the sound source includes a third sound source that outputs a third signal as a signal input to the first speaker and the second speaker; and a fourth sound source that outputs a fourth signal as a signal input to the first speaker and the second speaker, the third signal includes a third band noise, the fourth signal includes a fourth band noise, a frequency of the third band noise is different from a frequency of the fourth band noise, the phase shifter includes a third phase shifter that is provided between the third sound source and the second speaker, and that adjusts a phase of the third signal input to the second speaker; and a fourth phase shifter that is provided between the fourth sound source and the second speaker, and that adjusts a phase of the fourth signal input to the second speaker; the third phase shifter and the fourth phase shifter are each an mth-order phase shifter (m is an integer of one or more), the third signal having the phase adjusted by the third phase shifter and the fourth signal having the phase adjusted by the fourth phase shifter is input to the second speaker, the information processor controls the third phase shifter to increase a frequency range in which a phase difference between the third signal input to the first speaker and the third signal that is input to the second speaker and has the phase adjusted by the third phase shifter is greater than or equal to a predetermined value, with an increase of the speed of the vehicle, and the information processor controls the fourth phase shifter to increase frequency range in which a phase difference between the fourth signal input to the first speaker and the fourth signal that is input to the second speaker and has the phase adjusted by the fourth phase shifter is greater than or equal to a predetermined value, with an increase in the speed of the vehicle.

According to this, when the notification sound includes two band noises, the phase of each band noise can be individually adjusted.

A vehicle according to an aspect of the present disclosure includes the vehicle proximity notification device described above; the first speaker; and the second speaker.

According to this, it is possible to provide a vehicle that can reduce discomfort given to the passengers while effectively outputting a notification sound to the outside of the vehicle.

In addition, the first speaker and the second speaker may be included in a single speaker.

According to this, when the first speaker and the second speaker are not included in a single speaker but are provided separately, the notification sound from each speaker may be cancelled out or the sound pressure may be strengthened in an unexpected place in accordance with the distance between the first speaker and the second speaker. On the other hand, since the first speaker and the second speaker are included in a single speaker, it is possible to suppress the notification sound from each speaker from being cancelled out or the sound pressure from being strengthened at an unexpected place. In addition, since the first speaker and the second speaker are included in a single speaker, the cost can be reduced such that the first speaker and the second speaker need only be attached to the vehicle at one time or the like.

A vehicle proximity notification method according to an aspect of the present disclosure is a vehicle proximity notification method for notifying an approach of a vehicle using a first speaker and a second speaker provided in the vehicle, comprising: outputting a signal corresponding to a sound notifying the approach of the vehicle, the signal input to the first speaker and the second speaker; and changing a phase of at least one signal out of the signal input to the first speaker and the signal input to the second speaker in accordance with a speed of the vehicle.

According to this, it is possible to provide a vehicle proximity notification method that can reduce discomfort given to the passengers while effectively outputting a notification sound to the outside of the vehicle.

Hereinafter, embodiments of the present disclosure will be described with reference to the drawings. Note that each of the embodiments described below shows a specific example of the present disclosure. Numerical values, shapes, materials, components, arrangement positions and connection forms of components, steps, order of steps, and the like shown in the following embodiments are merely examples, and are not intended to limit the present disclosure. In addition, among the components in the following embodiments, components not described in the independent claims indicating the highest concept are described as arbitrary components.

Embodiment 1

FIG. 1 is a diagram illustrating an example of vehicle 200 equipped with vehicle proximity notification device 100 according to Embodiment 1.

As shown in FIG. 1, vehicle 200 includes vehicle proximity notification device 100, first speaker 51, and second speaker 52. Vehicle 200 is specifically an automobile, but is not particularly limited. Since vehicle 200 generates a notification sound output from first speaker 51 and second speaker 52 toward a pedestrian or the like outside the vehicle, first speaker 51 and second speaker 52 are installed outside the vehicle, for example. Note that vehicle 200 may include a speaker that outputs a notification sound in addition to first speaker 51 and second speaker 52.

Next, the configuration of vehicle proximity notification device 100 according to the present embodiment will be described.

Figure 2:
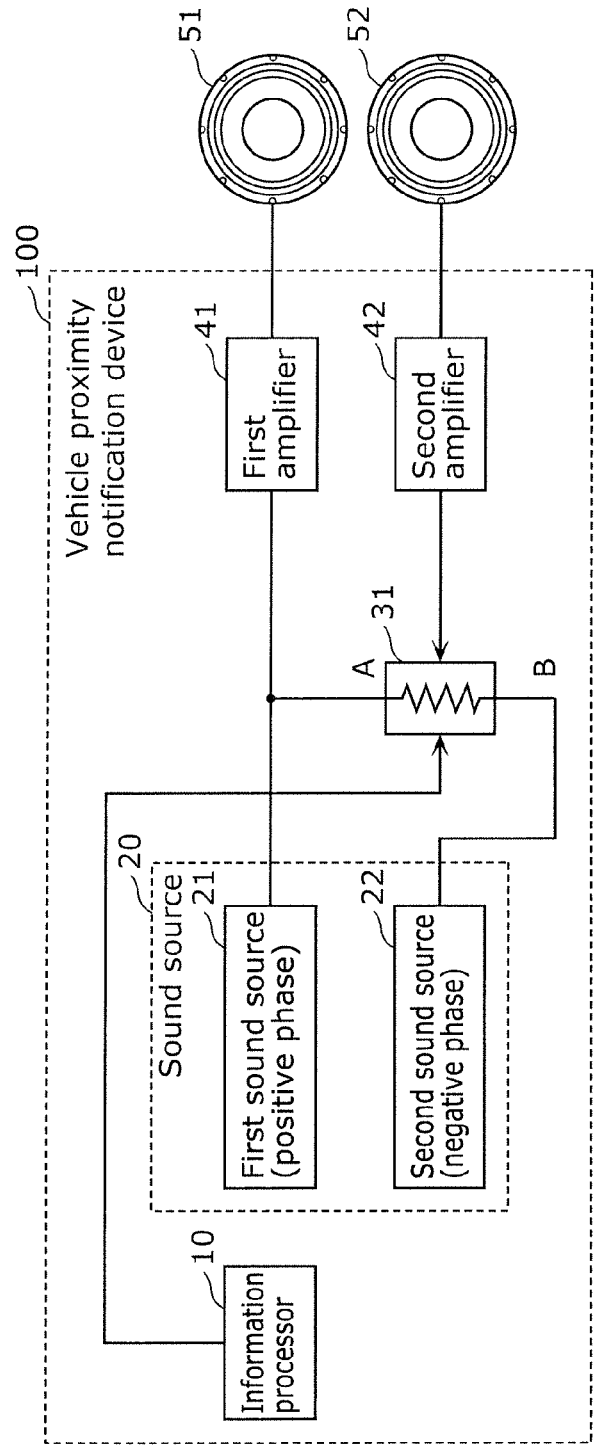
FIG. 2 is a block diagram showing a configuration of a vehicle proximity notification device according to Embodiment 1.

FIG. 2 is a block diagram showing a configuration of vehicle proximity notification device 100 according to the present embodiment.

As shown in FIG. 2, vehicle proximity notification device 100 includes information processor 10, sound source 20, switcher 31, first amplifier 41, and second amplifier 42. Note that FIG. 2 also shows first speaker 51 and second speaker 52 provided in vehicle 200.

Vehicle proximity notification device 100 is a device for notifying the approach of vehicle 200 using first speaker 51 and second speaker 52 provided in vehicle 200. Vehicle proximity notification device 100 notifies the approach of vehicle 200 by causing first speaker 51 and second speaker 52 to output a notification sound (for example, a warning sound) toward a pedestrian or the like outside the vehicle.

Sound source 20 outputs a signal (electric signal) that corresponds to a sound for notifying the approach of vehicle 200, and is input to first speaker 51 and second speaker 52. The sound for notifying the approach of vehicle 200 is, for example, an engine sound. In this case, sound source 20 often uses a pseudo engine sound or an electronic sound, and it is configured by, for example, a low-pitched portion of 300 Hz to 700 Hz and frequency components of 1 kHz to 3 kHz. In addition, the sound for notifying the approach of vehicle 200 may be a simple sine wave signal sound or the like. Sound source 20 may be realized by, for example, a storage device (not shown).

For example, sound source 20 includes first sound source 21 that outputs a first signal as a signal input to at least first speaker 51, and second sound source 22 that outputs a second signal as a signal input to second speaker 52. The second signal has a phase opposite to that of the first signal. That is, assuming that the phase of the first signal output from first sound source 21 is the positive phase, the phase of the second signal output from second sound source 22 is the opposite phase. Note that the opposite phase is intended to include a case where the phase difference is not completely 180 degrees. That is, even when the phase difference between the phase of the first signal and the phase of the second signal deviates to some extent from 180 degrees, the second signal may be a signal having the opposite phase to the first signal.

The first signal is input to first speaker 51 and is input or not input to second speaker 52 in accordance with the speed of vehicle 200. In addition, the second signal is not input to first speaker 51 and is input or not input to second speaker 52 in accordance with the speed of vehicle 200. That is, first speaker 51 and second speaker 52 output in-phase notification sounds or opposite-phase notification sounds in accordance with the speed of vehicle 200. Note that when the first signal is input to first speaker 51 via first amplifier 41 and is input to second speaker 52, the first signal is input to second speaker 52 via switcher 31 and second amplifier 42. When input to second speaker 52, the second signal is input to second speaker 52 via switcher 31 and second amplifier 42.

Switcher 31 is configured to switch between the first signal and the second signal to be input to second speaker 52, and specifically, is a mixer. Note that switcher 31 may be a switch that switches the signal input to second speaker 52 between the first signal and the second signal. Switcher 31 performs the switching by an instruction (for example, a control signal) from information processor 10.

First amplifier 41 is connected between first sound source 21 and first speaker 51. First amplifier 41 amplifies the signal output from first sound source 21 with a predetermined amplification degree and outputs the amplified signal to first speaker 51.

Second amplifier 42 is connected between switcher 31 and second speaker 52. Second amplifier 42 amplifies a signal output from first sound source 21 or second sound source 22 with a predetermined amplification degree and outputs the amplified signal to second speaker 52. The amplification degree at this time may be the same as or different from the amplification degree of first amplifier 41.

Note that first amplifier 41 and second amplifier 42 may be analog amplifiers or digital amplifiers.

First speaker 51 and second speaker 52 output a notification sound for notifying the approach of vehicle 200 to the outside. First speaker 51 and second speaker 52 have a function of converting an electric signal into mechanical vibration, and output a notification sound of a sound pressure based on the electric signal. First speaker 51 outputs a sound corresponding to the signal output from first sound source 21. Second speaker 52 outputs a notification sound corresponding to the signal output from first sound source 21 or second sound source 22. In accordance with the vehicle speed, first speaker 51 may output a notification sound having a phase opposite to that of the notification sound output from second speaker 52.

Information processor 10 is realized by, for example, a microcomputer (microcontroller). The microcomputer is a semiconductor integrated circuit and the like having a ROM storing a program, a RAM, a processor (CPU: Central Processing Unit) for executing the program, and the like. For example, information processor 10 executes the following processes by the processor executing the program described above.

Information processor 10 changes the phase of at least one signal out of the signal input to first speaker 51 and the signal input to second speaker 52 in accordance with the speed of vehicle 200. Information processor 10 has a function of acquiring the speed of vehicle 200 from, for example, an ECU (Electronic Control Unit) and the like. Information processor 10 controls switcher 31 such that the first signal is input to second speaker 52 when vehicle 200 is stationary. Specifically, information processor 10 controls switcher 31 such that second amplifier 42 is connected to the A side of switcher 31 when vehicle 200 is stationary. In addition, information processor 10 controls switcher 31 such that the second signal is input to second speaker 52 when the speed of vehicle 200 is greater than or equal to a predetermined speed. Specifically, information processor 10 controls switcher 31 such that second amplifier 42 is connected to the B side of switcher 31 when the speed of vehicle 200 is greater than or equal to a predetermined speed. The predetermined speed is, for example, 30 km/h or the like. The ratio of the first signal and the second signal input to second speaker 52 in accordance with the vehicle speed will be described with reference to FIG. 3.

Figure 3:
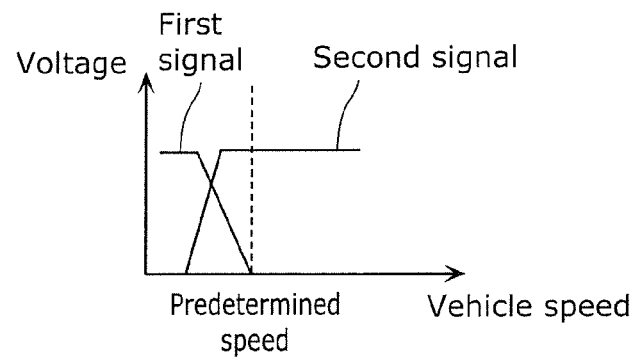
FIG. 3 is a graph showing a relationship between (i) a first signal from a first sound source input to a second speaker and a second signal from a second sound source, and (ii) vehicle speed according to Embodiment 1.

FIG. 3 is a graph showing the relationship between (i) the first signal from first sound source 21 and the second signal from second sound source 22 input to second speaker 52, and (ii) the vehicle speed in accordance with Embodiment 1.

As illustrated in FIG. 3, information processor 10 controls switcher 31 such that as the speed of vehicle 200 increases toward a predetermined speed, the ratio of the second signal input to second speaker 52 to the first signal is increased, and when the speed of vehicle 200 reaches a predetermined speed, the first signal is not input to second speaker 52 and the second signal is input to second speaker 52. Since switcher 31 is a mixer, switcher 31 can be controlled such that the second signal is gradually input to second speaker 52.

Next, the directivity of the notification sound output from first speaker 51 and second speaker 52 when vehicle 200 is stationary will be described with reference to FIG. 4A.

Figure 4A:
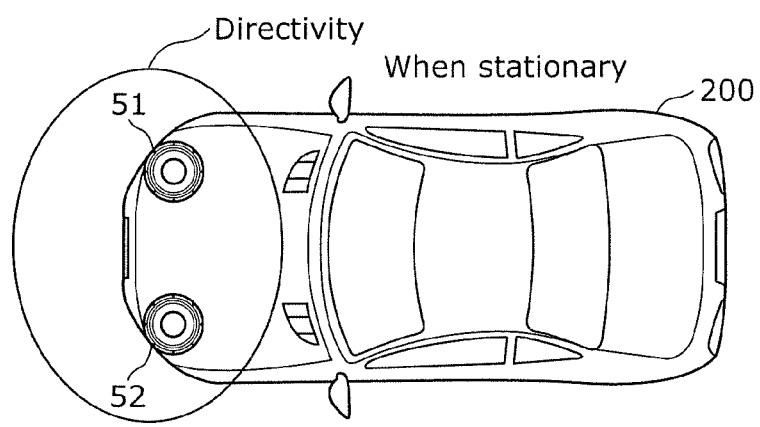
FIG. 4A is a diagram for describing the directivity of the notification sound output from the first speaker and the second speaker according to Embodiment 1 when the vehicle is stationary.

FIG. 4A is a diagram for describing the directivity of the notification sound output from first speaker 51 and second speaker 52 according to Embodiment 1 when vehicle 200 is stationary.

When vehicle 200 is stationary, the first signal is input to both first speaker 51 and second speaker 52. That is, signals of the same phase are input to first speaker 51 and second speaker 52. Thereby, the directivity of the notification sound output from first speaker 51 and second speaker 52 becomes substantially uniform directivity (non-directional) as shown in FIG. 4A. That is, when vehicle 200 is stationary, the notification sound can be sufficiently output around the vehicle including the front of vehicle 200.

Next, the directivity of the notification sound output from first speaker 51 and second speaker 52 when vehicle 200 is in motion (specifically, when the speed of vehicle 200 is greater than or equal to a predetermined speed) will be described with reference to FIG. 4B.

Figure 4B:
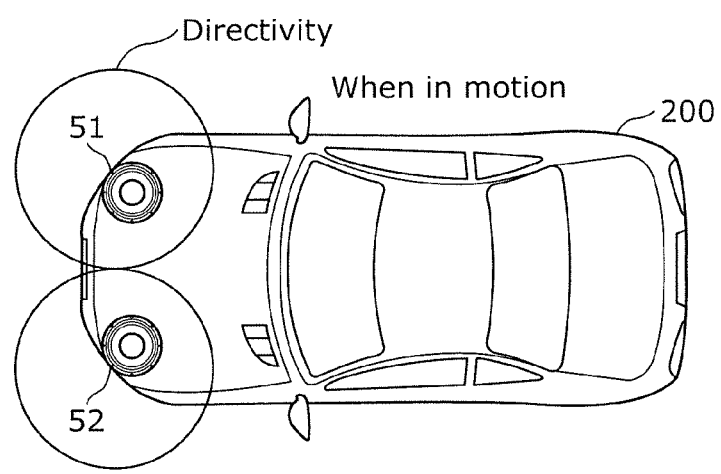
FIG. 4B is a diagram for describing the directivity of the notification sound output from the first speaker and the second speaker according to Embodiment 1 when the vehicle is in motion.

FIG. 4B is a diagram for describing the directivity of the notification sound output from first speaker 51 and second speaker 52 according to Embodiment 1 when vehicle 200 is in motion.

When vehicle 200 is in motion, the first signal is input to first speaker 51 and the second signal is input to second speaker 52. That is, signals having opposite phases are input to first speaker 51 and second speaker 52, respectively. Thereby, as shown in FIG. 4B, the directivity of the notification sound output from first speaker 51 and second speaker 52 is changed to the dipole directivity such that the direction with less sound radiation is directed to the front of vehicle 200 and the vehicle interior.

For example, as stipulated by the North American NHTSA regulations, when vehicle 200 is stationary, the notification sound at the front of vehicle 200 is required to be greater than or equal to a certain sound pressure value, but is not required when vehicle 200 is in motion. Therefore, in accordance with the vehicle speed, for example, when vehicle 200 is stationary, the phase of at least one signal out of the signal input to first speaker 51 and the signal input to second speaker 52 (here, the signal input to second speaker 52) is not changed. In other words, the signal input to second speaker 52 is not changed from the first signal. In addition, in accordance with the vehicle speed, for example, when vehicle 200 is in motion, the phase of at least one signal out of a signal input to first speaker 51 and a signal input to second speaker 52 (here, a signal input to second speaker 52) is changed. In other words, the signal input to second speaker 52 is changed from the first signal to the second signal. Thereby, when vehicle 200 is in motion, dipole directivity can be realized such that the direction with less acoustic emission is directed toward the front of vehicle 200 and the vehicle interior. Therefore, when vehicle 200 is stationary, the notification sound can be sufficiently output around vehicle 200 including the front of vehicle 200, and when vehicle 200 is in motion, it is possible to reduce discomfort caused by the notification sound given to the passenger while sufficiently outputting the notification sound around vehicle 200 except for the front of vehicle 200 where the notification sound is not required to have a certain sound pressure or more. In this way, according to vehicle proximity notification device 100 in Embodiment 1, it is possible to reduce discomfort given to the passengers while effectively outputting a notification sound to the outside of the vehicle.

In addition, when vehicle 200 is stationary, it is possible to sufficiently output the notification sound around vehicle 200 including the front of vehicle 200 by controlling switcher 31 such that the same first signal is input to first speaker 51 and second speaker 52 (that is, by inputting a signal having the same phase to first speaker 51 and second speaker 52). On the other hand, when the vehicle speed is greater than or equal to a predetermined speed, the dipole directivity such that the direction of less acoustic radiation is directed to the front of vehicle 200 and the vehicle interior can be realized by controlling switcher 31 such that the first signal is input to first speaker 51 and the second signal is input to second speaker 52 (that is, by inputting signals of opposite phases to first speaker 51 and second speaker 52, respectively). In this way, by simply controlling switcher 31 in accordance with the vehicle speed, it is possible to easily reduce discomfort given to the passengers while effectively outputting a notification sound to the outside of the vehicle.

In addition, by using switcher 31 as a mixer, the directivity can be gradually changed to the dipole directivity as the vehicle speed increases.

Embodiment 2

Next, Embodiment 2 will be described with reference to FIGS. 5 to 7. Note that the vehicle proximity notification devices described in Embodiment 2 and subsequent embodiments are also provided in vehicle 200 in the same manner as in Embodiment 1.

Figure 5:
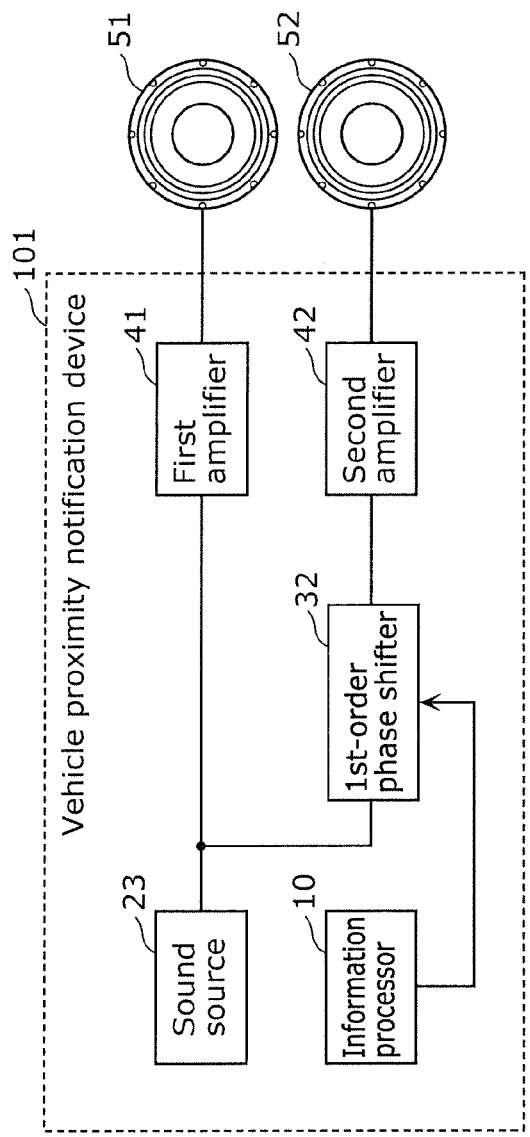
FIG. 5 is a block diagram showing a configuration of a vehicle proximity notification device according to Embodiment 2.

FIG. 5 is a block diagram showing a configuration of vehicle proximity notification device 101 according to Embodiment 2.

As shown in FIG. 5, vehicle proximity notification device 101 includes information processor 10, sound source 23, first-order phase shifter 32, first amplifier 41, and second amplifier 42. Note that FIG. 5 also shows first speaker 51 and second speaker 52 provided in vehicle 200. Since first amplifier 41, second amplifier 42, first speaker 51, and second speaker 52 are the same as those in Embodiment 1, description thereof will be omitted.

Sound source 23 outputs a signal (electric signal) that corresponds to a sound for notifying the approach of vehicle 200 and is input to first speaker 51 and second speaker 52. In Embodiment 2, vehicle proximity notification device 101 includes one sound source 23. The signal output from sound source 23 is input to first speaker 51 via first amplifier 41, and is input to second speaker 52 via first-order phase shifter 32 and second amplifier 42.

First-order phase shifter 32 is a phase shifter for providing between sound source 23 and at least one of first speaker 51 or second speaker 52, and adjusting the phase of at least one signal out of a signal input to first speaker 51 and a signal input to second speaker 52. Here, first-order phase shifter 32 is provided between sound source 23 and one of first speaker 51 and second speaker 52 (here, second speaker 52), and adjusts the phase of the signal input to one speaker (second speaker 52).

Information processor 10 controls first-order phase shifter 32 to change the phase of the at least one signal described above (here, the signal input to second speaker 52) in accordance with the speed of vehicle 200. Specifically, information processor 10 controls first-order phase shifter 32 to increase the frequency range in which the phase difference between the signal input to first speaker 51 and the signal input to second speaker 52 is greater than or equal to a predetermined value as the speed of vehicle 200 increases. This will be described with reference to FIGS. 6 and 7. Note that a phase difference where a signal input to first speaker 51 and a signal input to second speaker 52 have opposite phases to each other is referred to as a phase difference greater than or equal to a predetermined value. As described above, the opposite phase is intended to include a case where the phase difference is not 180 degrees. That is, when the signal input to second speaker 52 is a signal having a phase opposite to that of the signal input to first speaker 51, the phase difference between the phase of the signal input to first speaker 51 and that of the signal input to second speaker 52 may deviate from 180 degrees to some extent. For example, the predetermined value may be about 140 degrees.

Figure 6:
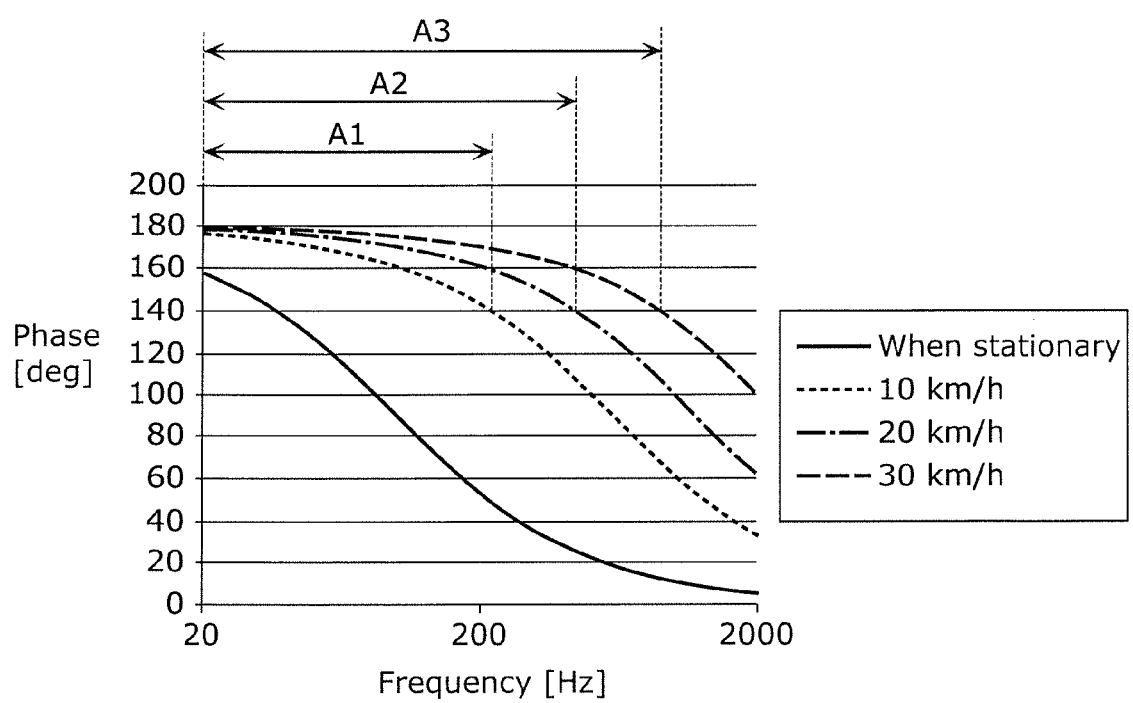
FIG. 6 is a graph showing a phase characteristic of the first-order phase shifter according to the second embodiment in accordance with a change in vehicle speed.

FIG. 6 is a graph showing a phase characteristic of first-order phase shifter 32 according to Embodiment 2 in accordance with changes in the vehicle speed.

Figure 7:
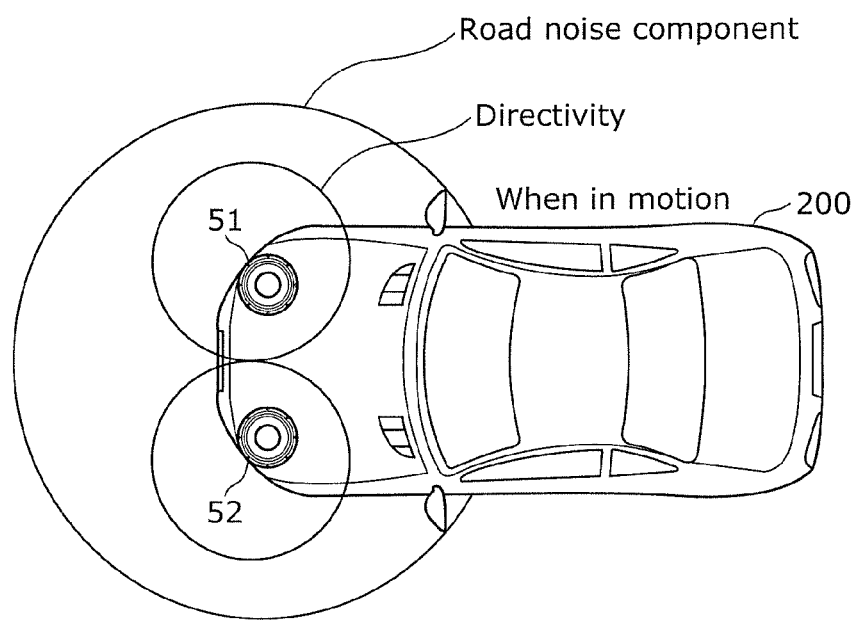
FIG. 7 is a diagram for describing the effect of road noise.

FIG. 7 is a diagram for describing the effect of the road noise.

As shown in FIG. 6, it can be seen that the frequency range in which the phase difference is greater than or equal to a predetermined value (for example, about 140 degrees) becomes wider as the speed of vehicle 200 increases such as A1 when the vehicle speed is 10 km/h, A2 when the vehicle speed is 20 km/h, and A3 when the vehicle speed is 30 km/h.

As shown in FIG. 6, first-order phase shifter 32 has a phase characteristic such that the lower the frequency is, the closer the phase is to 180 degree inversion. In general, when vehicle 200 starts moving, road noise including many low-frequency components starts to be generated from moving vehicle 200, and as the vehicle speed increases, higher frequency components are also included. Therefore, when vehicle 200 starts moving, even if the phase difference at a low frequency between the phase of the signal input to first speaker 51 and the phase of the signal input to second speaker 52 becomes nearly 180 degrees by first-order phase shifter 32 and the sound pressure of the low-frequency component of the notification sound is reduced, road noise including a large amount of low-frequency components is generated from moving vehicle 200. As shown in FIG. 7, the approach of vehicle 200 can be notified by supplementing the notification sound with the road noise even at the front of vehicle 200 in which the sound pressure of the low frequency component in the notification sound is reduced due to the dipole directivity. Since higher frequency components are included in the road noise as the vehicle speed increases, the frequency range in which the phase difference is greater than or equal to a predetermined value becomes wider as the vehicle speed increases (specifically, the frequency range increases toward the high frequency side). Even in front of vehicle 200 where the sound pressure of the notification sound is reduced at wide frequencies, the approach of vehicle 200 can be notified by road noise also including high frequency components.

Embodiment 3

Next, Embodiment 3 will be described with reference to FIGS. 8 to 11B.

Figure 8:
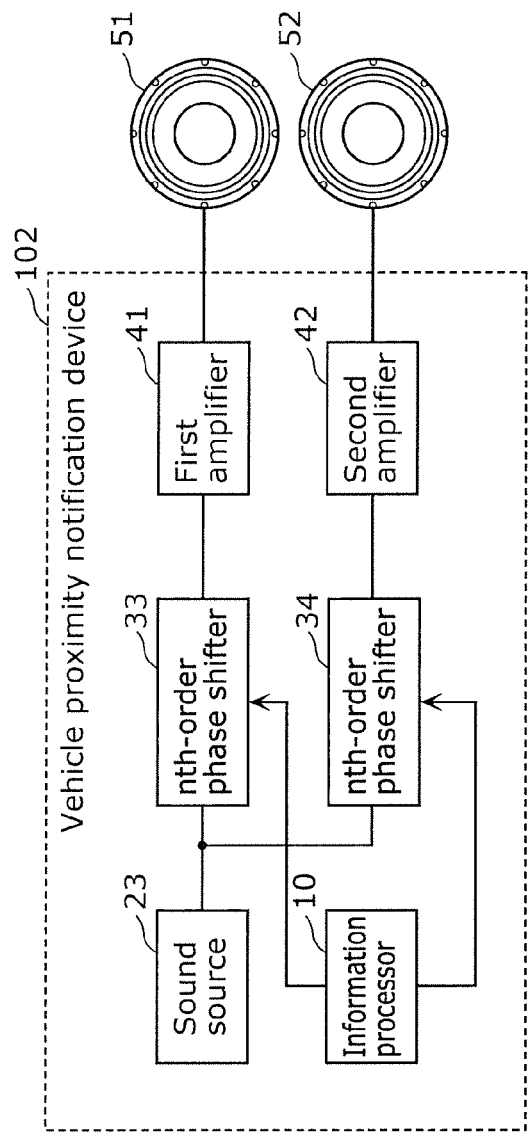
FIG. 8 is a block diagram showing a configuration of a vehicle proximity notification device according to Embodiment 3.

FIG. 8 is a block diagram showing a configuration of vehicle proximity notification device 102 according to Embodiment 3.

As shown in FIG. 8, vehicle proximity notification device 102 includes information processor 10, sound source 23, nth-order phase shifter 33 (n is an integer of two or more), nth-order phase shifter 34, first amplifier 41, and second amplifier 42. Note that FIG. 8 also shows first speaker 51 and second speaker 52 provided in vehicle 200. Since first amplifier 41, second amplifier 42, first speaker 51, and second speaker 52 are the same as those in Embodiment 1, the description thereof will be omitted.

Sound source 23 outputs a signal (electric signal) that corresponds to a sound for notifying the approach of vehicle 200 and is input to first speaker 51 and second speaker 52. In Embodiment 3, vehicle proximity notification device 102 includes one sound source 23. The signal output from sound source 23 is input to first speaker 51 via nth-order phase shifter 33 and first amplifier 41, and to second speaker 52 via nth-order phase shifter 34 and second amplifier 42.

Nth-order phase shifter 33 is a first phase shifter that is provided between sound source 23 and at least one of first speaker 51 or second speaker 52, and that is included in a phase shifter that adjusts the phase of at least one signal out of a signal input to first speaker 51 and a signal input to second speaker 52. Nth-order phase shifter 34 is a second phase shifter that is provided between sound source 23 and at least one of first speaker 51 or second speaker 52, and that is included in a phase shifter that adjusts the phase of at least one signal out of a signal input to first speaker 51 and a signal input to second speaker 52. Specifically, nth-order phase shifter 33 is a first phase shifter that is provided between sound source 23 and first speaker 51 and adjusts the phase of a signal input to first speaker 51. Nth-order phase shifter 34 is a second phase shifter that is provided between sound source 23 and second speaker 52 and adjusts the phase of a signal input to second speaker 52.

Information processor 10 controls nth-order phase shifter 33 such that the phase of the signal input to first speaker 51 changes in accordance with the speed of vehicle 200, and nth-order phase shifter 34 such that the phase of the signal input to second speaker 52 in accordance with the speed of vehicle 200. Specifically, information processor 10 controls nth-order phase shifter 33 and nth-order phase shifter 34 such that the frequency range in which the phase difference between the signal input to first speaker 51 and the signal input to second speaker 52 is equal to or larger than a predetermined value becomes wider as the speed of vehicle 200 increases. This will be described with reference to FIGS. 9A to 11B. Here, nth-order phase shifter 33 and nth-order phase shifter 34 are each a second-order phase shifter.

Figure 9A:
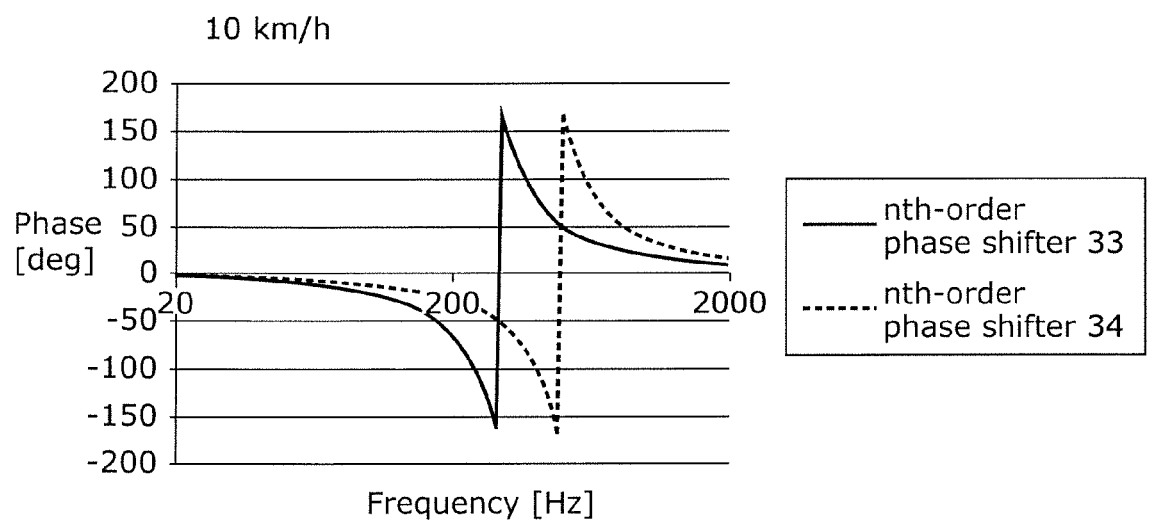
FIG. 9A is a graph showing a phase characteristic of a first phase shifter and a second phase shifter according to Embodiment 3 when the vehicle speed is 10 km/h.

FIG. 9A is a graph showing a phase characteristic of nth-order phase shifter 33 (first phase shifter) and nth-order phase shifter 34 (second phase shifter) according to Embodiment 3 when the vehicle speed is 10 km/h.

Figure 9B:
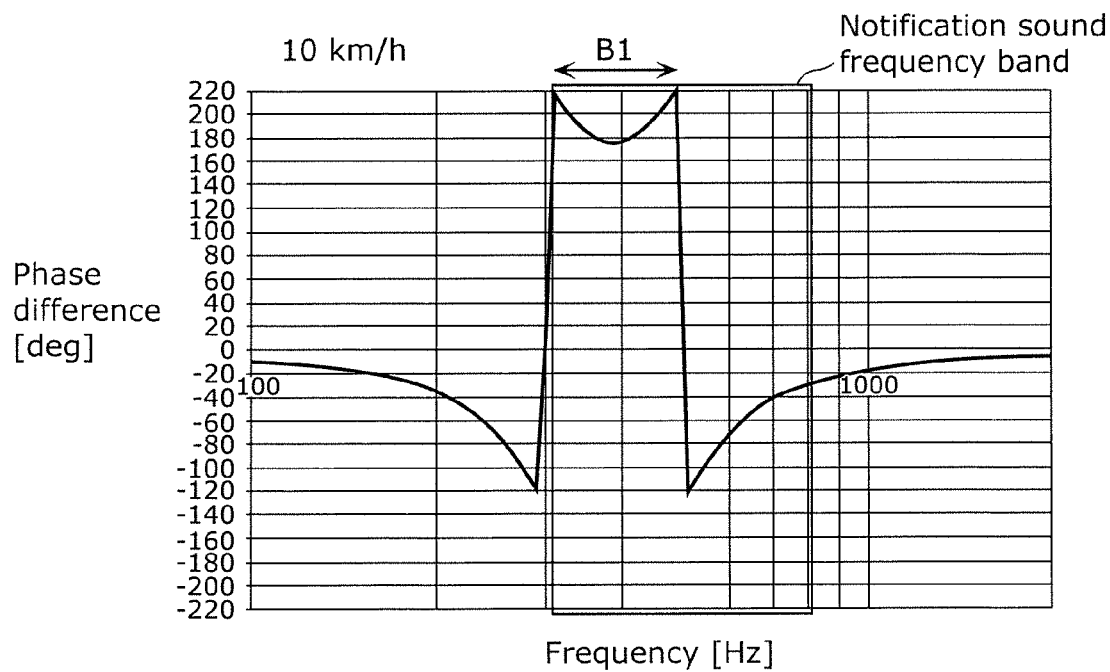
FIG. 9B is a graph showing a phase difference between a signal input to the first speaker and a signal input to the second speaker according to Embodiment 3 when the vehicle speed is 10 km/h.

FIG. 9B is a graph showing a phase difference between a signal input to first speaker 51 and a signal input to second speaker 52 according to Embodiment 3 when the vehicle speed is 10 km/h.

Figure 10A:
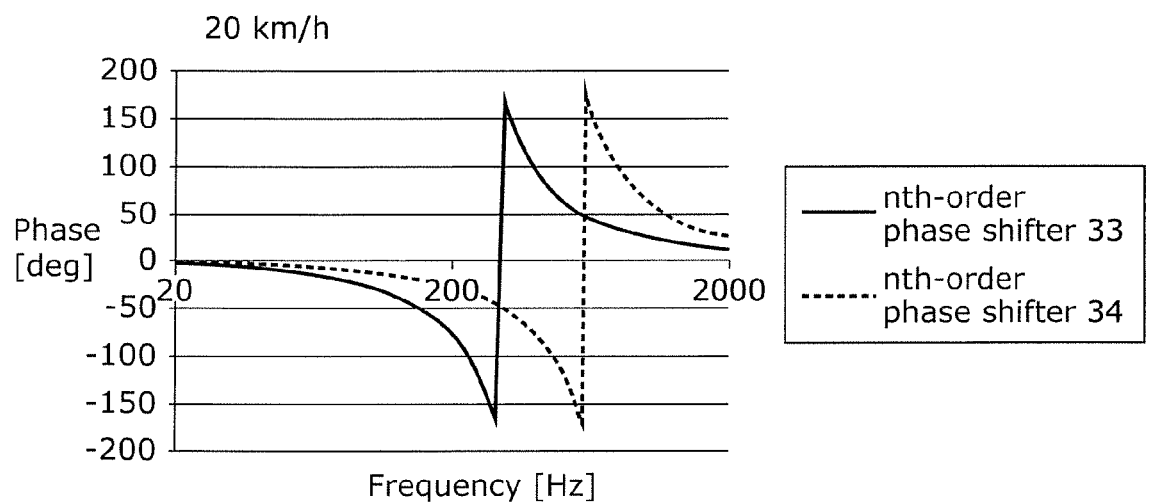
FIG. 10A is a graph showing a phase characteristic of a first phase shifter and a second phase shifter according to Embodiment 3 when the vehicle speed is 20 km/h.

FIG. 10A is a graph showing a phase characteristic of nth-order phase shifter 33 (first phase shifter) and nth-order phase shifter 34 (second phase shifter) according to Embodiment 3 when the vehicle speed is 20 km/h.

Figure 10B:
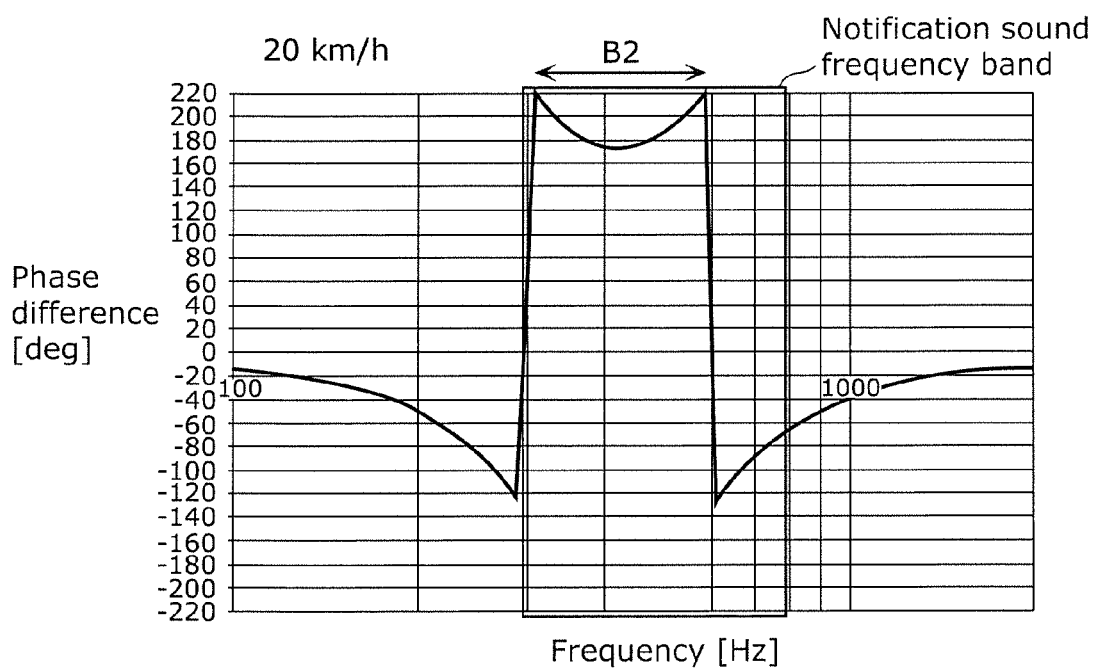
FIG. 10B is a graph showing a phase difference between a signal input to the first speaker and a signal input to the second speaker according to Embodiment 3 when the vehicle speed is 20 km/h.

FIG. 10B is a graph showing a phase difference between the signal input to first speaker 51 and the signal input to second speaker 52 according to Embodiment 3 when the vehicle speed is 20 km/h.

Figure 11A:
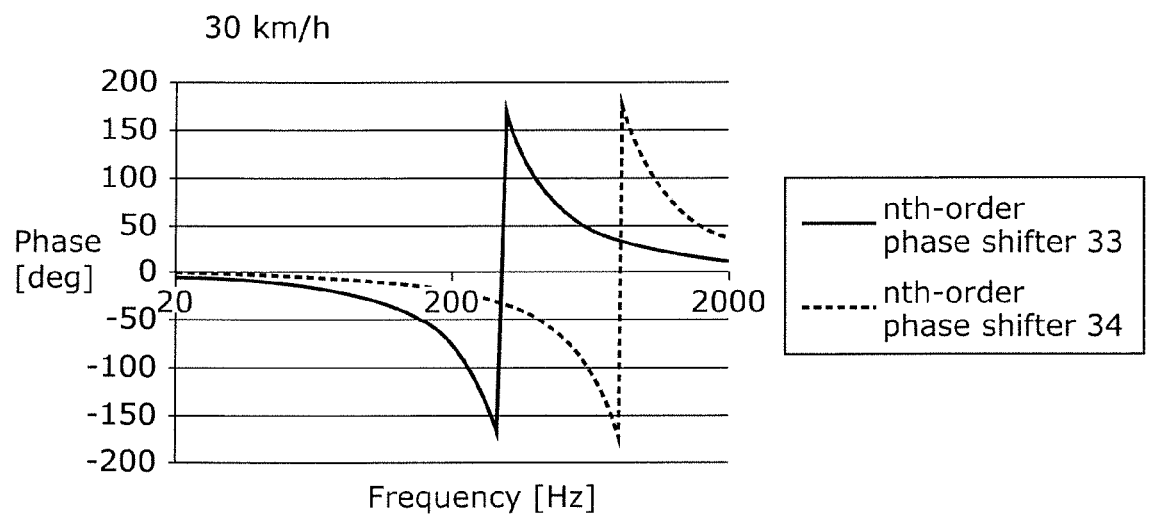
FIG. 11A is a graph showing a phase characteristic of a first phase shifter and a second phase shifter according to Embodiment 3 when the vehicle speed is 30 km/h.

FIG. 11A is a graph showing a phase characteristic of nth-order phase shifter 33 (first phase shifter) and nth-order phase shifter 34 (second phase shifter) according to Embodiment 3 when the vehicle speed is 30 km/h.

Figure 11B:
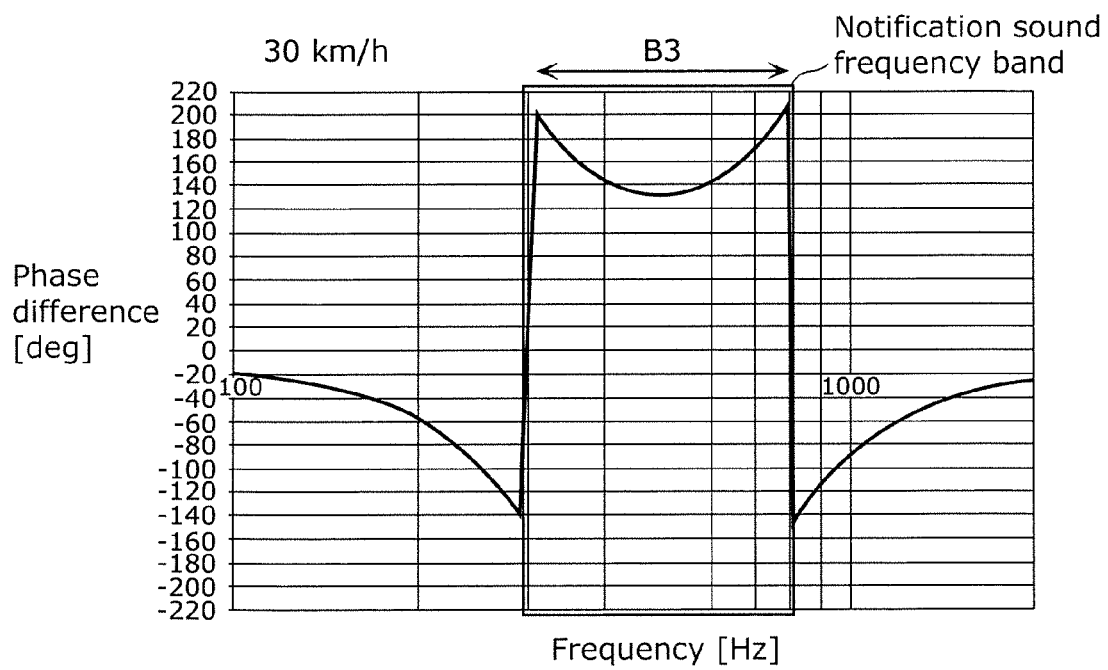
FIG. 11B is a graph showing a phase difference between a signal input to the first speaker and a signal input to the second speaker according to Embodiment 3 when the vehicle speed is 30 km/h.

FIG. 11B is a graph showing a phase difference between a signal input to first speaker 51 and a signal input to second speaker 52 according to Embodiment 3 when the vehicle speed is 30 km/h.

As shown in FIGS. 9A, 10A, and 11A, nth-order phase shifter 33 and nth-order phase shifter 34 have a phase characteristic such that the phase is inverted by 180 degrees at a specific frequency. Therefore, the phase difference in a specific frequency range can be greater than or equal to a predetermined value (for example, about 140 degrees) by individually adjusting and shifting the frequency at which the phase is inverted by 180 degrees between nth-order phase shifter 33 and nth-order phase shifter 34. For example, as shown in FIGS. 9A, 10A, and 11A, nth-order phase shifter 33 and nth-order phase shifter 34 separate the frequency at which the phase is inverted by 180 degrees as the speed of vehicle 200 increases.

Thereby, it can be seen as shown in FIGS. 9B, 10B and 11B that the frequency range in which the phase difference is greater than or equal to the predetermined value becomes wider as the speed of vehicle 200 increases such as B1 when the vehicle speed is 10 km/h, B2 when the vehicle speed is 20 km/h, and B3 when the vehicle speed is 30 km/h.

As described above, when vehicle 200 starts moving, road noise including many low-frequency components starts to occur from moving vehicle 200, and as the vehicle speed increases, the higher frequency components are also included. For example, in such a case that the frequency band of the notification sound is determined, when the vehicle speed is low, the phase difference can be set greater than or equal to a predetermined value only in a low frequency portion in a frequency band as shown in FIG. 9B, and when the vehicle speed is high, the phase difference can be set greater than or equal to the predetermined value from the low frequency to the entire high frequency in the frequency band as shown in FIG. 11B.

In this way, the frequency range in which the phase difference between the signal input to first speaker 51 and the signal input to second speaker 52 is greater than or equal to a predetermined value can be finely adjusted by adjusting the frequency at which the phase of the signal input to first speaker 51 is inverted by nth-order phase shifter 33, and adjusting the frequency at which the phase of the signal input to second speaker 52 is inverted by nth-order phase shifter 34.

Embodiment 4

Next, Embodiment 4 will be described with reference to FIGS. 12 and 13.

Figure 12:
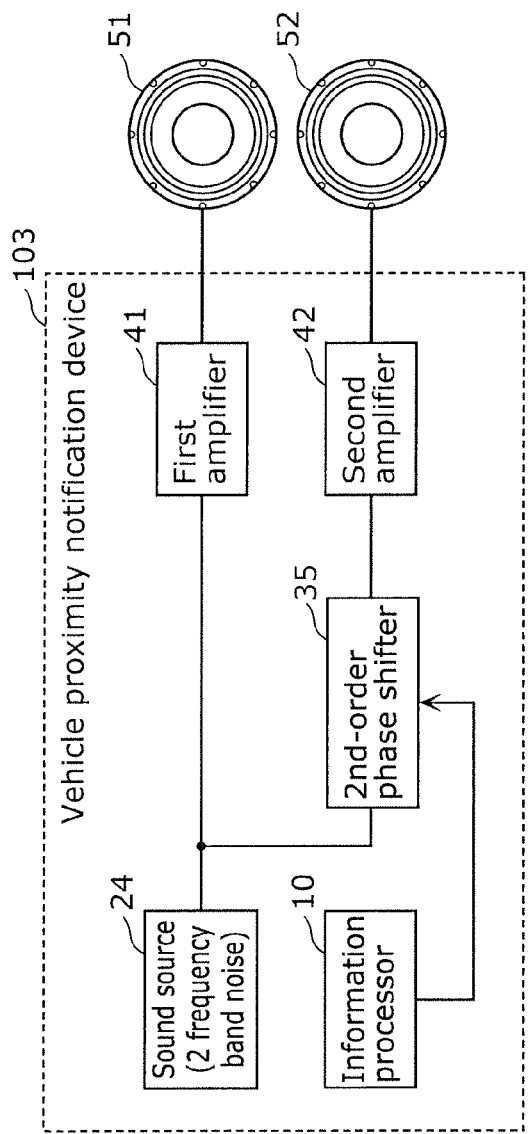
FIG. 12 is a block diagram showing a configuration of a vehicle proximity notification device according to Embodiment 4.

FIG. 12 is a block diagram showing a configuration of vehicle proximity notification device 103 according to Embodiment 4.

As shown in FIG. 12, vehicle proximity notification device 103 includes information processor 10, sound source 24, second-order phase shifter 35, first amplifier 41, and second amplifier 42. Note that FIG. 12 also shows first speaker 51 and second speaker 52 provided in vehicle 200. Since first amplifier 41, second amplifier 42, first speaker 51, and second speaker 52 are the same as those in Embodiment 1, the description thereof will be omitted.

Sound source 24 is a signal (electric signal) that corresponds to a sound for notifying the approach of vehicle 200 and is input to first speaker 51 and second speaker 52. In Embodiment 4, vehicle proximity notification device 103 includes one sound source 24. The signal output from sound source 24 includes a first band noise and a second band noise having different frequencies from each other. For example, the frequency of the first band noise is lower than the frequency of the second band noise. Specifically, the signal output from sound source 24 includes ⅓ octave band noise of 630 Hz as the first band noise and ⅓ octave band noise of 1 kHz as the second band noise. The signal output from sound source 24 is input to first speaker 51 via first amplifier 41, and is input to second speaker 52 via second-order phase shifter 35 and second amplifier 42.

Second-order phase shifter 35 is a phase shifter which is provided between sound source 24 and one speaker out of first speaker 51 and second speaker 52, and adjusts the phase of a signal input to the one speaker. Here, second-order phase shifter 35 is provided between sound source 24 and second speaker 52, and adjusts the phase of a signal input to second speaker 52.

Information processor 10 controls second-order phase shifter 35 such that the phase of at least one signal out of the signal input to first speaker 51 and the signal input to second speaker 52 changes in accordance with the speed of vehicle 200. For example, information processor 10 controls second-order phase shifter 35 such that a frequency range in which the phase difference between the signal input to first speaker 51 and the signal input to second speaker 52 is equal to or greater than a predetermined value overlaps with the frequency of the first band noise, and does not overlap with the frequency of the second band noise. This will be described with reference to FIG. 13.

Figure 13:
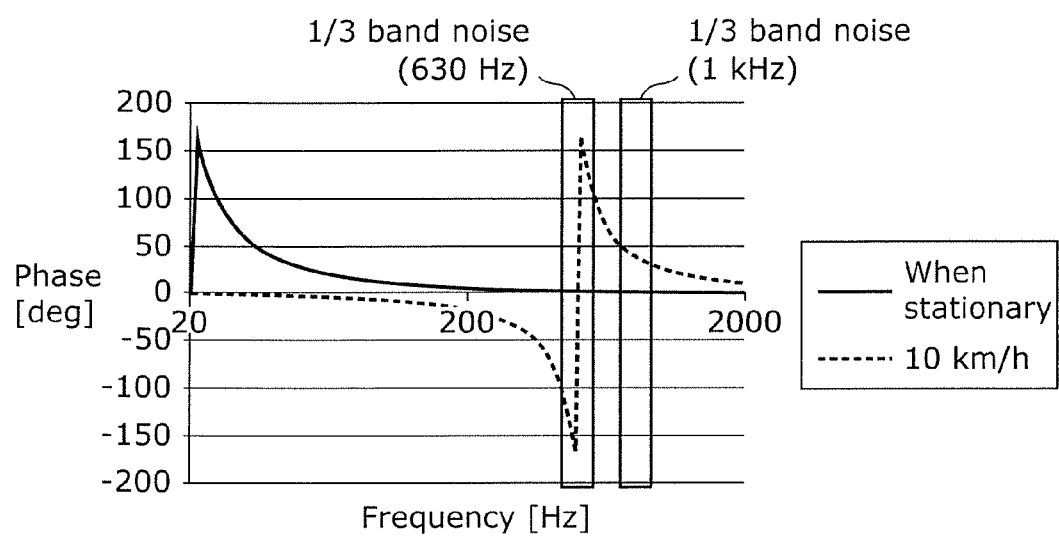
FIG. 13 is a graph showing a phase characteristic of the second-order phase shifter according to Embodiment 4 when the vehicle is stationary and the vehicle speed is 10 km/h.

FIG. 13 is a graph showing a phase characteristic of second-order phase shifter 35 according to Embodiment 4 when the vehicle is stationary and the vehicle speed is 10 km/h.

As shown in FIG. 13, second-order phase shifter 35 has a phase characteristic such that the phase is inverted by 180 degrees at a specific frequency. As shown in FIG. 13, for example, when the vehicle is stationary, the phase difference between a signal input to first speaker 51 and a signal input to second speaker 52 is made substantially zero at each frequency of two ⅓ octave band noises included in the notification sound. Thereby, when the vehicle is stationary, a notification sound including two ⅓ octave band noises can be sufficiently output to the periphery including the front of vehicle 200. When vehicle 200 starts moving and the vehicle speed is 10 km/h, for example, as shown in FIG. 13, the frequency of the first band noise and the vicinity of the frequency in which the phase is inverted by 180 degrees in second-order phase shifter 35 (that is, the frequency range in which the phase difference between the signal input to first speaker 51 and the signal input to second speaker 52 is greater than or equal to a predetermined value) overlaps, and the frequency of the second band noise and the vicinity of the frequency in which the phase is inverted by 180 degrees in second-order phase shifter 35 does not overlap.

When the notification sound includes two ⅓ octave band noises, by setting only one of the two ⅓ octave band noises (for example, one having a lower frequency) as an opposite phase, sound leakage of the notification sound to the vehicle interior may be reduced, and discomfort given to passengers may be reduced.

Embodiment 5

Next, Embodiment 5 will be described with reference to FIG. 14.

Figure 14:
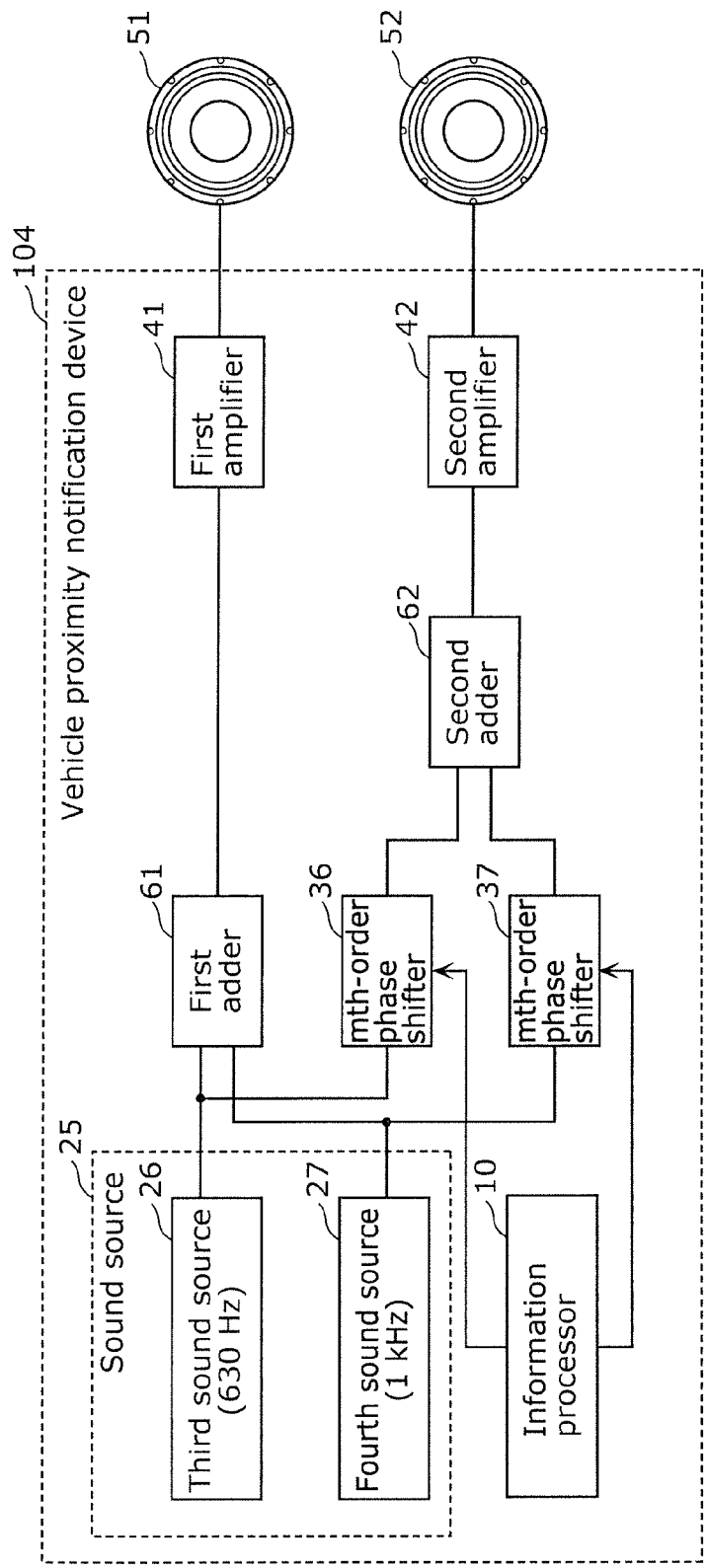
FIG. 14 is a block diagram showing a configuration of a vehicle proximity notification device according to Embodiment 5.

FIG. 14 is a block diagram showing a configuration of vehicle proximity notification device 104 according to Embodiment 5.

As shown in FIG. 14, vehicle proximity notification device 104 includes information processor 10, sound source 25, mth-order phase shifter 36 (m is an integer of one or more), mth-order phase shifter 37, first adder 61, second adder 62, first amplifier 41, and second amplifier 42. Note that FIG. 14 also shows first speaker 51 and second speaker 52 provided in vehicle 200. Since first amplifier 41, second amplifier 42, first speaker 51, and second speaker 52 are the same as those in Embodiment 1, the description thereof will be omitted.

Sound source 25 outputs a signal (electric signal) that corresponds to a sound for notifying the approach of vehicle 200, and is input to first speaker 51 and second speaker 52.

Sound source 25 includes third sound source 26 that outputs a third signal as a signal input to first speaker 51 and second speaker 52, and fourth sound source 27 that outputs a fourth signal as a signal input to first speaker 51 and second speaker 52. The third signal includes third band noise, and the fourth signal includes fourth band noise. The frequency of the third band noise is different from the frequency of the fourth band noise. For example, the third signal includes ⅓ octave band noise of 630 Hz as the third band noise, and the fourth signal includes ⅓ octave band noise of 1 kHz as the fourth band noise. The third signal is input to first speaker 51 via first adder 61 and first amplifier 41, and is input to second speaker 52 via mth-order phase shifter 36, second adder 62 and second amplifier 42. The fourth signal is input to first speaker 51 via first adder 61 and first amplifier 41, and is input to second speaker 52 via mth-order phase shifter 37, second adder 62 and second amplifier 42.

Mth-order phase shifter 36 is a third phase shifter that is provided between sound source 25 and at least one of first speaker 51 or second speaker 52, and is included in the phase shifters that adjust the phase of at least one signal out of the signal input to first speaker 51 and the signal input to second speaker 52. Mth-order phase shifter 37 is a fourth phase shifter that is provided between sound source 25 and at least one of first speaker 51 or second speaker 52, and is included in the phase shifters that adjust the phase of at least one signal out of the signal input to first speaker 51 and the signal input to second speaker 52. Specifically, mth-order phase shifter 36 is a third phase shifter that is provided between third sound source 26 and second speaker 52 and adjusts the phase of a signal input to second speaker 52. Mth-order phase shifter 37 is a fourth phase shifter that is provided between fourth sound source 27 and second speaker 52 and adjusts the phase of a signal input to second speaker 52. That is, the third signal having the phase adjusted by mth-order phase shifter 36 and the fourth signal having the phase adjusted by mth-order phase shifter 37 are input to second speaker 52. Note that the third signal and the fourth signal having the phases not adjusted are input to first speaker 51. For example, each of mth-order phase shifter 36 and mth-order phase shifter 37 is a first-order phase shifter or a second-order phase shifter.

First adder 61 adds the third signal output from third sound source 26 and the fourth signal output from fourth sound source 27 to output the result to first amplifier 41. Second adder 62 adds the third signal having the phase adjusted by mth-order phase shifter 36 after it is output from third sound source 26 and the fourth signal having the phase adjusted by mth-order phase shifter 37 after it is output from fourth sound source 27 to output the result to second amplifier 42.

Information processor 10 controls mth-order phase shifter 36 such that the phase of the signal input to first speaker 51 changes in accordance with the speed of vehicle 200, and mth-order phase shifter 37 such that the phase of the signal input to second speaker 52 changes in accordance with the speed of vehicle 200. Specifically, information processor 10 controls mth-order phase shifter 36 such that the frequency range in which the phase difference between the third signal input to first speaker 51 and the third signal input to second speaker 52 and having the phase adjusted by mth-order phase shifter 36 is greater than or equal to a predetermined value becomes wider as the speed of vehicle 200 increases. In addition, information processor 10 controls mth-order phase shifter 37 such that the frequency range in which the phase difference between the fourth signal input to first speaker 51 and the fourth signal input to second speaker 52 and having the phase adjusted by mth-order phase shifter 37 is greater than or equal to a predetermined value becomes wider as the speed of vehicle 200 increases.

Thereby, the phase of the 630 Hz band noise from third sound source 26 can be individually adjusted by mth-order phase shifter 36, and the phase of the 1 kHz band noise from fourth sound source 27 can be individually adjusted by mth-order phase shifter 37. In this way, when two band noises are included in the notification sound, the phase of each band noise can be individually adjusted. Therefore, it is possible to reduce the discomfort given to the passengers for each band noise while effectively outputting the notification sound to the outside of the vehicle for each band noise.

Other Embodiments

Although the vehicle proximity notification device and the vehicle equipped with the vehicle proximity notification device according to the embodiments of the present disclosure have been described above, the present disclosure is not limited to these embodiments.

Figure 15:
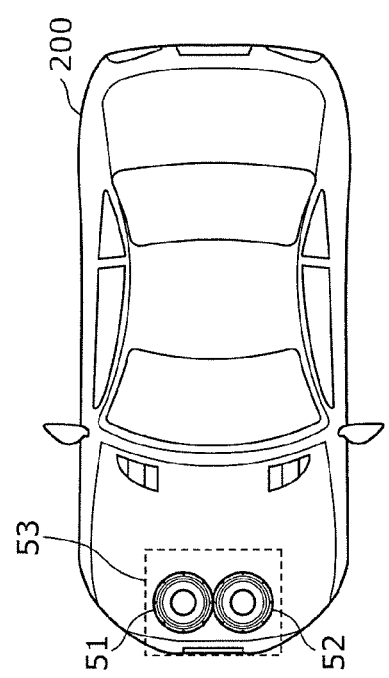
FIG. 15 is a diagram schematically showing a state in which a first speaker and a second speaker according to another embodiment are integrally provided.

For example, in the embodiments described above, first speaker 51 and second speaker 52 are provided separately as shown in FIG. 1 and the like, but may be included in a single speaker as shown in FIG. 15.

FIG. 15 is a diagram schematically illustrating a state in which first speaker 51 and second speaker 52 according to another embodiment are integrally provided.

As shown in FIG. 15, first speaker 51 and second speaker 52 may be packaged as one speaker system 53.

When first speaker 51 and second speaker 52 are not included in a single speaker and are provided separately, the notification sound from each speaker may cancel out or the sound pressure may be strengthened at an unexpected place in accordance with the distance between first speaker 51 and second speaker 52. On the other hand, when first speaker 51 and second speaker 52 are included in a single speaker, it is possible to suppress the notification sound from each speaker from being cancelled out or the sound pressure from being strengthened at an unexpected place. In addition, since first speaker 51 and second speaker 52 are included in a single speaker, the cost can be reduced such that first speaker 51 and second speaker 52 need only be attached to vehicle 200 at one time or the like.

Note that the present disclosure can be realized not only as a vehicle proximity notification device, but also as a vehicle proximity notification method including steps (processes) performed by each component configuring the vehicle proximity notification device.

Figure 16:
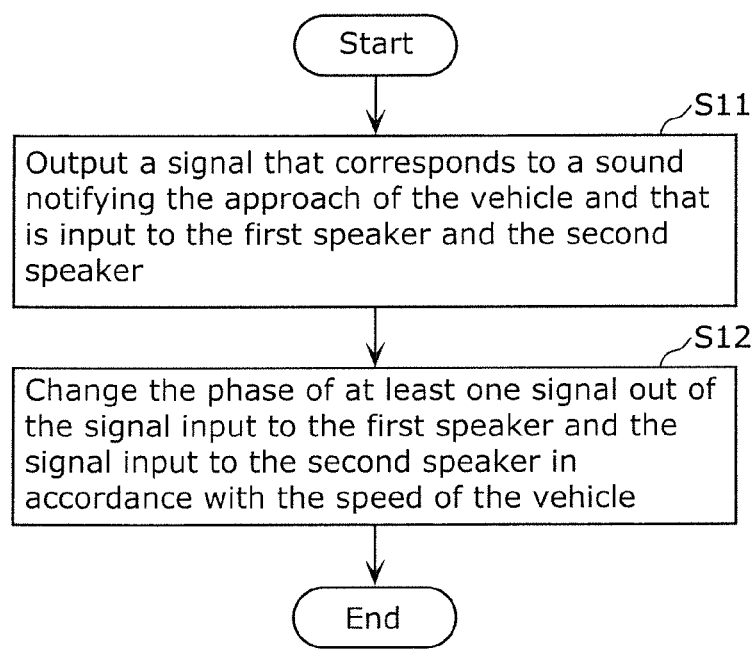
FIG. 16 is a flowchart showing an example of a vehicle proximity notification method according to another embodiment.

FIG. 16 is a flowchart illustrating an example of a vehicle proximity notification method according to another embodiment.

The vehicle proximity notification method is a method for notifying an approach of vehicle 200 using first speaker 51 and second speaker 52 provided in vehicle 200, including: outputting a signal that corresponds to a sound notifying the approach of vehicle 200 and is input to first speaker 51 and second speaker 52 (step S11); and changing a phase of at least one signal out of the signal input to first speaker 51 and the signal input to second speaker 52 in accordance with a speed of vehicle 200 (step S12), as shown in FIG. 16.

For example, the steps in the vehicle proximity notification method may be executed by a computer (computer system). Then, the present disclosure can be realized as a program for causing a computer to execute the steps included in the vehicle proximity notification method.

Furthermore, the present disclosure can be realized as a non-transitory computer-readable recording medium such as a CD-ROM in which the program is recorded.

For example, when the present disclosure is realized by a program (software), each step is executed by executing the program using hardware resources such as a CPU, a memory, and an input/output circuit of a computer. That is, each step is executed by the CPU acquiring data from the memory, the input/output circuit or the like and performing an operation, or outputting an operation result to the memory, the input/output circuit or the like.

In addition, each component included in the vehicle proximity notification device according to the above embodiments may be realized as a dedicated or general-purpose circuit.

In addition, each component included in the vehicle proximity notification device of the above embodiments may be realized as an LSI (Large Scale Integration) that is an integrated circuit (IC).

In addition, the integrated circuit is not limited to an LSI, and may be realized by a dedicated circuit or a general-purpose processor. A programmable FPGA (Field Programmable Gate Array) or a reconfigurable processor in which the connection and setting of circuit cells inside the LSI can be reconfigured may be used.

Furthermore, if an integrated circuit technology that replaces the LSI appears due to the advancement of the semiconductor technology or another technology derived therefrom, naturally, each component included in the vehicle proximity notification device may be integrated using the technology.

In addition, a form obtained by performing various modifications that can be conceived by those skilled in the art to the embodiment, and a form realized by arbitrarily combining the components and functions in each embodiment without departing from the spirit of the present disclosure are also included in this disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

Further Information about Technical Background to this Application

The disclosure of the following Japanese Patent Application including specification, drawings and claims are incorporated herein by reference in its entirety: Japanese Patent Application No. 2019-061993 filed on Mar. 27, 2019.

INDUSTRIAL APPLICABILITY

The present disclosure can be applied to a vehicle proximity notification device provided in a low-noise vehicle and the like such as an electric vehicle and a hybrid vehicle.

The invention claimed is:

1. A vehicle proximity notification device for notifying an approach of a vehicle using a first speaker and a second speaker which are provided in the vehicle, the vehicle proximity notification device comprising:
a sound source that outputs a signal that corresponds to a sound for notifying an approach of the vehicle and that is input to the first speaker and the second speaker; and
an information processor that changes a phase of at least one signal out of a signal input to the first speaker and a signal input to the second speaker in accordance with a speed of the vehicle, wherein
the sound source includes at least a first sound source that outputs a first signal as a signal input to the first speaker, and a second sound source that outputs a second signal as a signal input to the second speaker,
the second signal is a signal having an opposite phase to the first signal,
the vehicle proximity notification device further comprises a switcher for switching between the first signal and the second signal to be input to the second speaker, and
the information processor controls the switcher such that the first signal is input to the second speaker when the vehicle is stationary, and the second signal is input to the second speaker when the speed of the vehicle is greater than or equal to a predetermined speed.

2. The vehicle proximity notification device according to claim 1, wherein
the switcher is a mixer, and
the information processor controls the switcher to increase a ratio of the second signal input to the second speaker relative to the first signal as the speed of the vehicle increases toward the predetermined speed, and to prevent the first signal from being input to the second speaker and to cause the second signal to be input to the second speaker when the speed of the vehicle reaches the predetermined speed.

3. The vehicle proximity notification device according to claim 1, further comprising:
a phase shifter that is provided between the sound source and at least one of the first speaker or the second speaker, and adjusts the phase of the at least one signal, wherein
the information processor controls the phase shifter such that the phase of the at least one signal changes in accordance with a speed of the vehicle.

4. The vehicle proximity notification device according to claim 3, wherein
the information processor controls the phase shifter to increase a frequency range in which a phase difference between the signal input to the first speaker and the signal input to the second speaker is greater than or equal to a predetermined value as the speed of the vehicle increases.

5. The vehicle proximity notification device according to claim 4, wherein
the phase shifter is a first-order phase shifter that is provided between the sound source and one speaker out of the first speaker and the second speaker, and adjusts a phase of the signal input to the one speaker.

6. The vehicle proximity notification device according to claim 4, wherein
the phase shifter includes:
a first phase shifter that is provided between the sound source and the first speaker, and adjusts a phase of a signal input to the first speaker; and
a second phase shifter that is provided between the sound source and the second speaker, and adjusts a phase of a signal input to the second speaker, and
the first phase shifter and the second phase shifter are each an nth-order phase shifter, n being an integer of two or more.

7. The vehicle proximity notification device according to claim 3, wherein
the phase shifter is a second-order phase shifter that is provided between the sound source and one speaker of the first speaker or the second speaker, and adjusts a phase of a signal input to the one speaker,
the signal output from the sound source includes a first band noise and a second band noise having different frequencies from each other, and
the information processor controls the phase shifter to cause a frequency range in which a phase difference between a signal input to the first speaker and a signal input to the second speaker is greater than or equal to a predetermined value and a frequency of the first band noise to overlap, and prevent the frequency range and a frequency of the second band noise from overlapping.

8. The vehicle proximity notification device according to claim 7, wherein
the frequency of the first band noise is lower than the frequency of the second band noise.

9. The vehicle proximity notification device according to claim 3, wherein
the sound source includes a third sound source that outputs a third signal as a signal input to the first speaker and the second speaker; and a fourth sound source that outputs a fourth signal as a signal input to the first speaker and the second speaker,
the third signal includes a third band noise,
the fourth signal includes a fourth band noise,
a frequency of the third band noise is different from a frequency of the fourth band noise,
the phase shifter includes a third phase shifter that is provided between the third sound source and the second speaker, and that adjusts a phase of the third signal input to the second speaker; and a fourth phase shifter that is provided between the fourth sound source and the second speaker, and that adjusts a phase of the fourth signal input to the second speaker;
the third phase shifter and the fourth phase shifter are each an mth-order phase shifter, m being an integer of one or more,
the third signal having the phase adjusted by the third phase shifter and the fourth signal having the phase adjusted by the fourth phase shifter is input to the second speaker,
the information processor controls the third phase shifter to increase a frequency range in which a phase difference between the third signal input to the first speaker and the third signal that is input to the second speaker and has the phase adjusted by the third phase shifter is greater than or equal to a predetermined value as the speed of the vehicle increases, and the information processor controls the fourth phase shifter to increase frequency range in which a phase difference between the fourth signal input to the first speaker and the fourth signal that is input to the second speaker and has the phase adjusted by the fourth phase shifter is greater than or equal to a predetermined value as the speed of the vehicle increases.

10. A vehicle, comprising:
the vehicle proximity notification device according to claim 1;
the first speaker; and
the second speaker.

11. The vehicle according to claim 10, wherein
the first speaker and the second speaker included in a single speaker.

12. A vehicle proximity notification method for notifying an approach of a vehicle using a first speaker and a second speaker provided in the vehicle, the vehicle proximity notification method comprising:

outputting, by a sound source, a signal that corresponds to a sound notifying the approach of the vehicle, and is input to the first speaker and the second speaker;

changing, by an information processor, a phase of at least one signal out of the signal input to the first speaker and the signal input to the second speaker in accordance with a speed of the vehicle;

outputting, by the sound source, a first signal as a signal input to the first speaker, and a second signal as a signal input to the second speaker, the second signal being a signal having an opposite phase to the first signal; and switching, by a switcher, between the first signal and the second signal to be input to the second speaker such that the first signal is input to the second speaker when the vehicle is stationary, and the second signal is input to the second speaker when the speed of the vehicle is greater than or equal to a predetermined speed.

* * * * *